US011660828B2

(12) United States Patent
Dostal

(10) Patent No.: US 11,660,828 B2
(45) Date of Patent: May 30, 2023

(54) COMPOSITE FABRICATION SYSTEM WITH ALTERNATING AIR PRESSURE CONTROL

(71) Applicant: The Boeing Company, Chicago, IL (US)

(72) Inventor: Juergen Dostal, Melbourne (AU)

(73) Assignee: The Boeing Company, Chicago, IL (US)

( * ) Notice: Subject to any disclaimer, the term of this patent is extended or adjusted under 35 U.S.C. 154(b) by 685 days.

(21) Appl. No.: 16/056,766

(22) Filed: Aug. 7, 2018

(65) Prior Publication Data

US 2020/0047433 A1   Feb. 13, 2020

(51) Int. Cl.
| | | |
|---|---|---|
| *B29C 70/44* | (2006.01) | |
| *B29C 37/00* | (2006.01) | |
| *B29C 70/54* | (2006.01) | |
| *B29L 31/30* | (2006.01) | |

(52) U.S. Cl.
CPC .......... *B29C 70/44* (2013.01); *B29C 37/0003* (2013.01); *B29C 70/541* (2013.01); *B29L 2031/3076* (2013.01)

(58) Field of Classification Search
CPC ......... B29C 70/34; B29C 70/40; B29C 70/44; B29C 70/541; B29C 37/0003; B29C 33/0003; B29C 33/44; B29L 2031/3076; B22D 17/2236
USPC ................. 264/511, 520, 523, 526, 529, 544, 264/546–548, 553–554, 571–572, 301, 264/304
See application file for complete search history.

(56) References Cited

U.S. PATENT DOCUMENTS

| | | | | |
|---|---|---|---|---|
| 5,464,337 A | * | 11/1995 | Bernardon ............ | B29C 33/302 264/257 |
| 2010/0310818 A1 | * | 12/2010 | Pridie ................. | B29C 43/3642 428/114 |
| 2012/0282105 A1 | * | 11/2012 | Grife ..................... | F03D 1/0675 416/228 |
| 2013/0241117 A1 | * | 9/2013 | Lind ..................... | B29C 70/443 264/511 |
| 2014/0175709 A1 | * | 6/2014 | Blackburn .............. | B29C 51/10 264/554 |
| 2017/0050393 A1 | * | 2/2017 | Duclos .................... | B29C 43/34 |

FOREIGN PATENT DOCUMENTS

| | | |
|---|---|---|
| CN | 109774193 A | 5/2019 |
| EP | 2639050 A1 | 9/2013 |

OTHER PUBLICATIONS

United Kingdom Intellectual Property Office Search Report, dated Feb. 4, 2020, regarding Application No. GB1911241.6, 5 pages.
Intellectual Property Office (IPO) Examination Report, dated Dec. 8, 2020, regarding Application No. GB1911241.6, 2 pages.

* cited by examiner

*Primary Examiner* — Francisco W Tschen
*Assistant Examiner* — Edgaredmanuel Troche
(74) *Attorney, Agent, or Firm* — Yee & Associates, P.C.

(57) ABSTRACT

A method and system for fabricating a composite structure is provided. A first vacuum bag is laid down on a surface of a tool. A composite material is positioned on top of the first vacuum bag on the tool. A second vacuum bag covers the composite material. Vacuum pressure is applied to the first vacuum bag and the second vacuum bag. The composite material is cured to form the composite structure. The first vacuum bag is inflated with compressed air to lift the composite structure from the tool.

20 Claims, 8 Drawing Sheets

COMPOSITE FABRICATION SYSTEM WITH ALTERNATING AIR PRESSURE CONTROL

BACKGROUND INFORMATION

1. Field

The present disclosure relates generally to manufacturing composite structures. More specifically, the present disclosure relates to a method and system for composite structure manufacturing that uses air pressure regulation to release a cured composite structure from its tooling.

2. Background

Manufacturers increasingly use composite structures to provide light-weight and structurally sound parts for various applications. Many of these composite structures are manufactured using vacuum bag processing. With such techniques, composite material is laid up on a tool and cured using heat and pressure to form a desired shape for the parts.

During curing, a vacuum bag surrounds a part and a vacuum applies pressure to contour the composite material against the tool. In some fabrication systems, an additional bag is needed to serve as a barrier between the surface of the tool and the composite material. A vacuum is applied to this bag as well.

After curing, the composite structure is removed from the fabrication system for further processing. Composite structures that are long and heavy, or difficult to remove, may cause efficiency and ergonomic challenges. For instance, it may be more difficult or more time-consuming than desired to remove the composite structure from the vacuum bag protecting the tool. Additional challenges may include the risk of injury to human operators.

Therefore, it would be desirable to have a method and apparatus that takes into account at least some of the issues discussed above, as well as other possible issues.

SUMMARY

An illustrative embodiment of the present disclosure provides a method for fabricating a composite structure. A first vacuum bag is laid down on a surface of a tool. A composite material is positioned on top of the first vacuum bag on the tool. The composite material is covered with a second vacuum bag. Vacuum pressure is applied to the first vacuum bag and the second vacuum bag at substantially the same time. The composite material is cured to form the composite structure. The first vacuum bag is inflated with compressed air to lift the composite structure from the tool.

Another illustrative embodiment of the present disclosure provides a composite fabrication system comprising a tool, a first vacuum bag, and an air pressure control system. The first vacuum bag is positioned over a surface of the tool. The air pressure control system is associated with the first vacuum bag and is configured to alternate between vacuum pressure and compressed air. The compressed air inflates the first vacuum bag to lift a composite structure off the tool.

A further illustrative embodiment of the present disclosure provides a method for fabricating a composite structure for an aircraft. A first vacuum bag is laid down on a surface of a tool. A composite preform is positioned on top of the first vacuum bag on the tool. The composite preform is covered with a second vacuum bag. The composite preform is infused with resin. Vacuum pressure is applied to the first vacuum bag and the second vacuum bag. The composite preform and the resin are cured to form the composite structure. The first vacuum bag is inflated with compressed air such that the compressed air lifts the composite structure from the tool.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the manufacturing process for composite structures is often more time-consuming than desired. Current double diaphragm vacuum bag curing processes may require significant manpower to remove long, heavy, or difficult to remove parts from tooling. During removal, operators may face repetitive strain or face other injury risk. Pulling the bagging from the part along its entire length can increase manufacturing time and complexity.

Thus, the disclosed embodiments relate to a low cost, efficient, ergonomically advantageous debagging process that mitigates the risk of injury to operators. Compressed air is used to release the entire length of the part from the tool at once. The part can then be moved from the tool to another location for further processing. The composite fabrication system disclosed herein eliminates the need for human operators to pull the part from the tool bagging.

Figure 1:
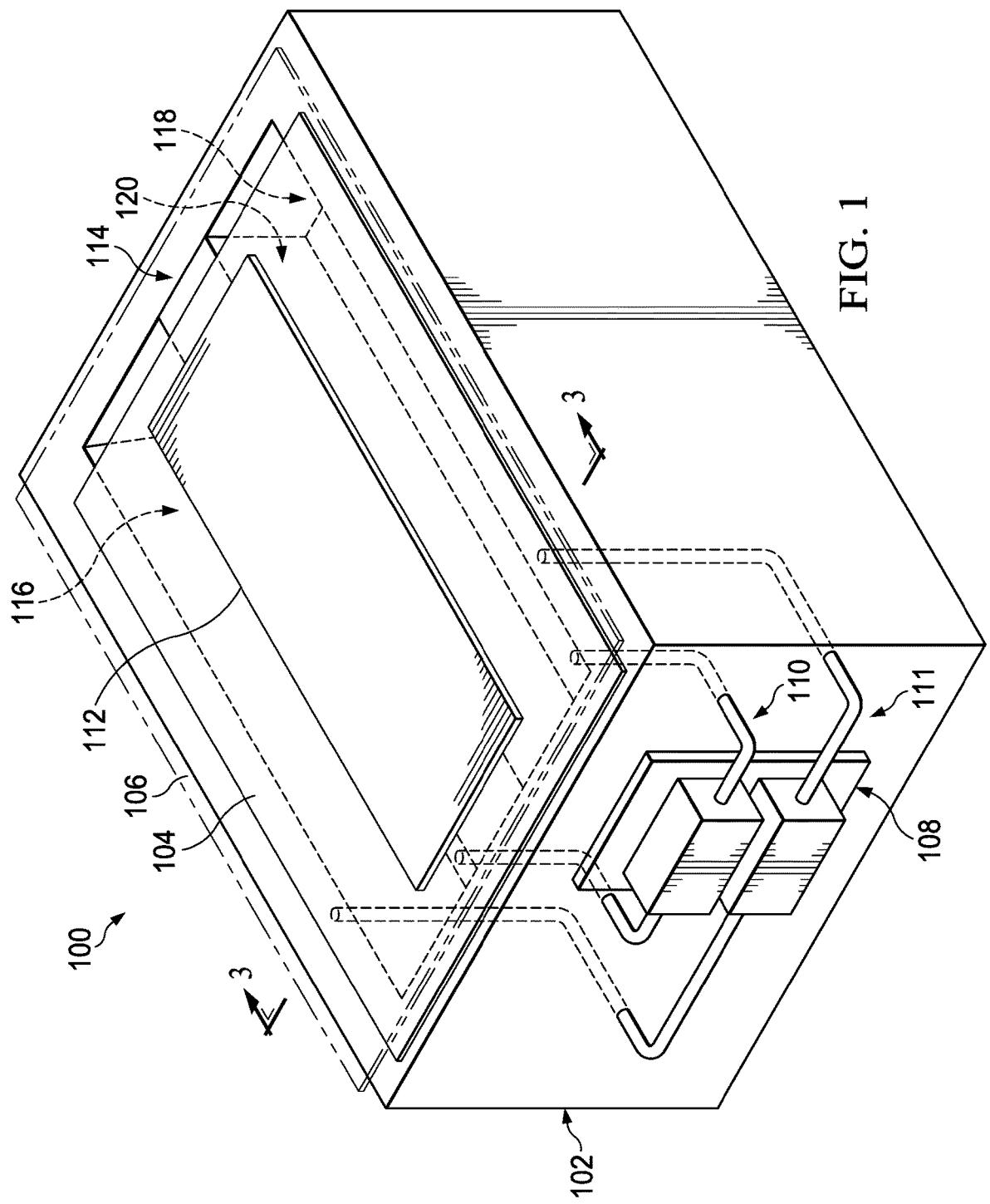
FIG. 1 is an illustration of a perspective view of a composite fabrication system in accordance with an illustrative embodiment.

With reference now to the figures and, in particular, with reference to FIG. 1, an illustration of a perspective view of a composite fabrication system is depicted in accordance with an illustrative embodiment. Composite fabrication system 100 comprises a combination of components and/or devices capable of employing vacuum bag techniques to consolidate and cure composite material 112.

In this illustrative example, composite fabrication system 100 comprises tool 102, vacuum bag 104, vacuum bag 106, and air pressure control system 108. Supply lines 110 are in fluid communication with air pressure control system 108 and vacuum bag 104. In a similar fashion, supply lines 111 are in fluid communication with air pressure control system 108 and vacuum bag 106.

Composite material 112 has been laid up in a desired manner on tool 102 in this illustrative example. Vacuum bag 104 is positioned between surface 114 of tool 102 and composite material 112. Vacuum bag 106 covers composite material 112.

As depicted, tool 102 comprises cavity 116, cavity 118, and mandrel 120. When air pressure control system 108 pulls a vacuum on vacuum bag 104 and vacuum bag 106, composite material 112 forms over mandrel 120.

Figure 2:
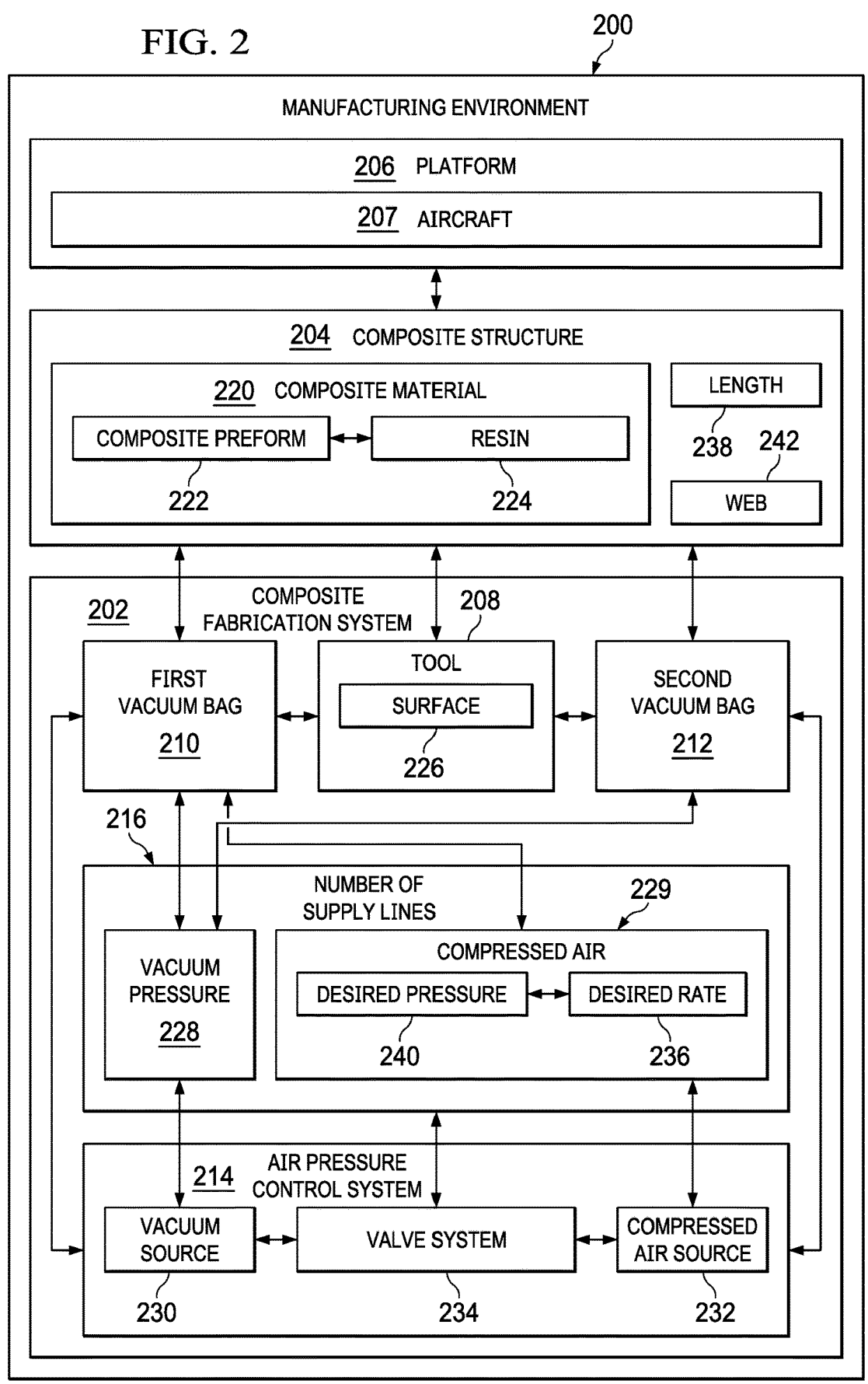
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 is an environment where components within composite fabrication system 202 may be used to manufacture composite structure 204. Specifically, components within composite fabrication system 202 may be used to form and cure composite structure 204.

Composite structure 204 is a structure configured for use in platform 206. Platform 206 may be, for example, without limitation, a mobile platform, a stationary platform, a land-based structure, an aquatic-based structure, or a space-based structure. More specifically, the platform may be an aircraft, a surface ship, a tank, a personnel carrier, a train, a spacecraft, a space station, a satellite, a submarine, an automobile, a power plant, a bridge, a dam, a house, a manufacturing facility, a building, and other suitable platforms.

Platform 206 takes the form of aircraft 207 in this illustrative example. When composite structure 204 is manufactured for aircraft 207, composite structure 204 may take the form of, for example, without limitation, a wing, a spar, a rib, a stabilizer, a panel, or some other suitable structure configured for use in aircraft 207.

As depicted, composite fabrication system 202 comprises tool 208, first vacuum bag 210, second vacuum bag 212, air pressure control system 214, and number of supply lines 216. As used herein, "a number of" when used with reference to items means one or more items. Thus, a number of supply lines includes one or more supply line.

Tool 208 is a rigid mold for forming composite structure 204. During manufacturing of composite structure 204, composite material 220 is laid up on tool 208 in a desired manner. Composite material 220 may take the form of prepreg in some illustrative examples. In other illustrative examples, composite material 220 may comprise composite preform 222 and resin 224. Resin 224 is infused into composite preform 222 prior to curing.

As depicted, first vacuum bag 210 is positioned over surface 226 of tool 208. First vacuum bag 210 acts as a barrier between composite material 220 and tool 208. First vacuum bag 210 may be positioned over surface 226 of tool 208 down the entire length of tool 208 that will encounter composite material 220. Vacuum pressure 228 is applied to first vacuum bag 210 to pull first vacuum bag 210 against surface 226 of tool 208.

Second vacuum bag 212 may have the same or a different size, shape, and material than first vacuum bag 210. In this illustrative example, second vacuum bag 212 covers composite material 220 over tool 208. Vacuum pressure 228 is also applied to second vacuum bag 212. Vacuum pressure 228 pulls composite material 220 against surface 226 of tool 208 to shape composite material 220 in a desired manner.

Air pressure control system 214 is associated with first vacuum bag 210 and second vacuum bag 212. Air pressure control system 214 is configured to alternate between vacuum pressure 228 and compressed air 229. Compressed air 229 is used to inflate first vacuum bag 210 to lift composite structure 204 off of tool 208 after curing.

In this illustrative example, air pressure control system 214 comprises vacuum source 230, compressed air source 232, and valve system 234. Vacuum source 230 is configured to apply vacuum pressure 228 to first vacuum bag 210, second vacuum bag 212, or both. Vacuum source 230 may have a number of compressors in this illustrative example. For instance, one compressor may be configured to pull a vacuum on first vacuum bag 210 while a second compressor may be configured to pull a vacuum on second vacuum bag 212.

Compressed air source 232 is configured to supply compressed air 229 to first vacuum bag 210 to inflate first vacuum bag 210 after curing. As first vacuum bag 210 inflates, composite structure 204 is lifted from tool 208 for ease of removal. Compressed air source 232 may be shop air or some other suitable source. Compressed air source 232 may also be associated with second vacuum bag 212 in other illustrative examples.

As depicted, compressed air source 232 is configured to inflate first vacuum bag 210 at desired rate 236 along length 238 of composite structure 204. Desired rate 236 may be selected to fill first vacuum bag 210 in a manner that effectively separates composite structure 204 from tool 208 without risking damage to composite structure 204. Compressed air source 232 is further configured to supply compressed air 229 to first vacuum bag 210 at desired pressure 240, corresponding to desired rate 236 of lift for composite structure 204. Desired rate 236 and desired pressure 240 for compressed air 229 may be selected and preprogrammed or manually adjusted by an operator.

In this illustrative example, valve system 234 comprises a group of components configured alternate number of supply lines 216 to first vacuum bag 210 between vacuum source 230 and the compressed air source 232. For example, during curing, valve system 234 supplies number of supply lines 216 connected to first vacuum bag 210 with vacuum pressure 228 from vacuum source 230. Once composite structure 204 is cured, the debagging process begins. At this point, valve system 234 switches such that compressed air source 232 supplies number of supply lines 216 with compressed air 229 to lift composite structure 204 off tool 208. Valve system 234 also may be associated with second vacuum bag 212 in other illustrative examples.

With an illustrative embodiment, manufacturing of composite structure 204 may take less time than with currently used systems. Compressed air source 232 may be easily attached to number of supply lines 216 through valve system 234 without additional modifications of tooling or assembly systems. Compressed air 229 lifts composite structure 204 along its web 242, thus mitigating the risk of damage to composite structure 204. Since composite structure 204 is separated from tool 208 along its entire length, without manual removal using human operators, the process occurs more efficiently with less risk of strain or injury to the operators. Composite structure 204 can almost immediately be moved to another station for additional processing.

Figure 3:
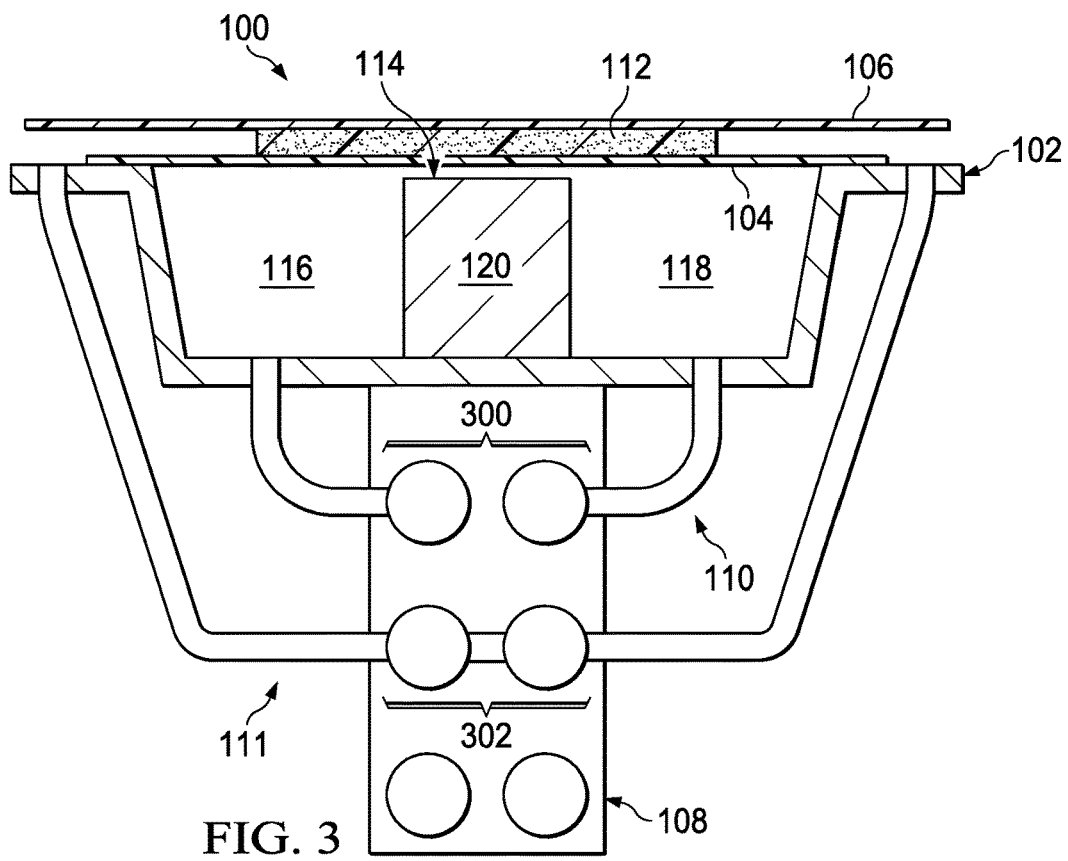
FIG. 3 is an illustration of a cross-sectional view of a composite fabrication system in accordance with an illustrative embodiment.

With reference next to FIG. 3, an illustration of a cross-sectional view of a composite fabrication system is depicted in accordance with an illustrative embodiment. FIG. 3 shows a cross-sectional view of composite fabrication system 100 along lines 3-3 shown in FIG. 1. FIG. 3 illustrates an example of one implementation of components within composite fabrication system 202 as shown in block form in FIG. 2.

As depicted, air pressure control system 108 comprises vacuum source 300 and vacuum source 302. Vacuum source 300 is configured to pull a vacuum on vacuum bag 104 in this illustrative example. Vacuum source 302 is configured to pull a vacuum on vacuum bag 106. Both vacuum bag 104 and vacuum bag 106 have been secured using a combination of components to prevent air leaking from either bag.

Supply lines 110 and supply lines 111 are secured to openings (not shown in this view) in tool 102. More or fewer supply lines may be connected to each vacuum source than shown in this view, depending on the particular implementation.

FIG. 3 shows composite fabrication system 100 before airflow is manipulated. Composite material 112 is positioned between vacuum bag 104 and vacuum bag 106 in a double diaphragm configuration.

Figure 4:
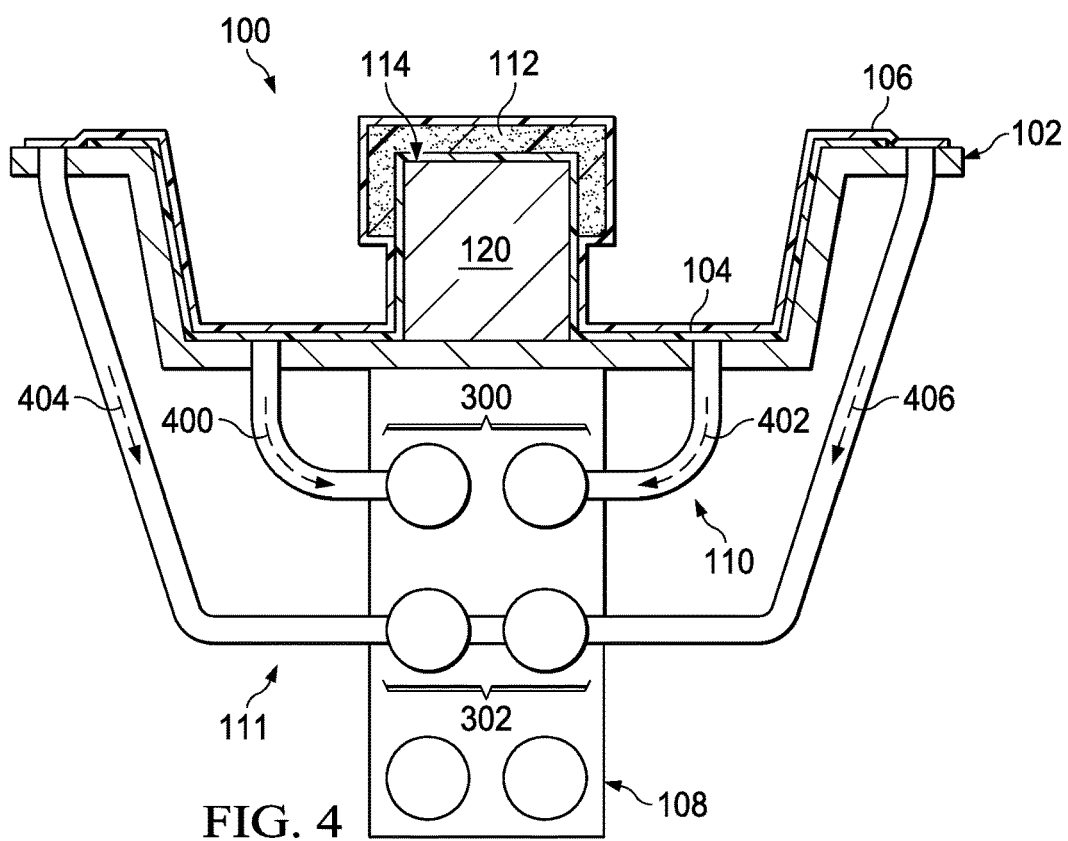
FIG. 4 is another illustration of a cross-sectional view of a composite fabrication system in accordance with an illustrative embodiment.

Turning now to FIG. 4, another illustration of a cross-sectional view of a composite fabrication system is depicted in accordance with an illustrative embodiment. In this illustrative example, vacuum source 300 applies vacuum pressure to vacuum bag 104 such that vacuum bag 104 contours to the shape of tool 102. Air is pulled out of vacuum bag 104 through supply lines 110 in the direction of arrow 400 and arrow 402.

Vacuum source 302 applies vacuum pressure to vacuum bag 106 in the same manner and at substantially the same time. Vacuum bag 106 causes composite material 112 to form to the shape of mandrel 120. Air is pulled out of vacuum bag 106 through supply lines 111 in the direction of arrow 404 and arrow 406 in this illustrative example. The assembly may then be placed in an autoclave for curing of composite material 112.

Figure 5:
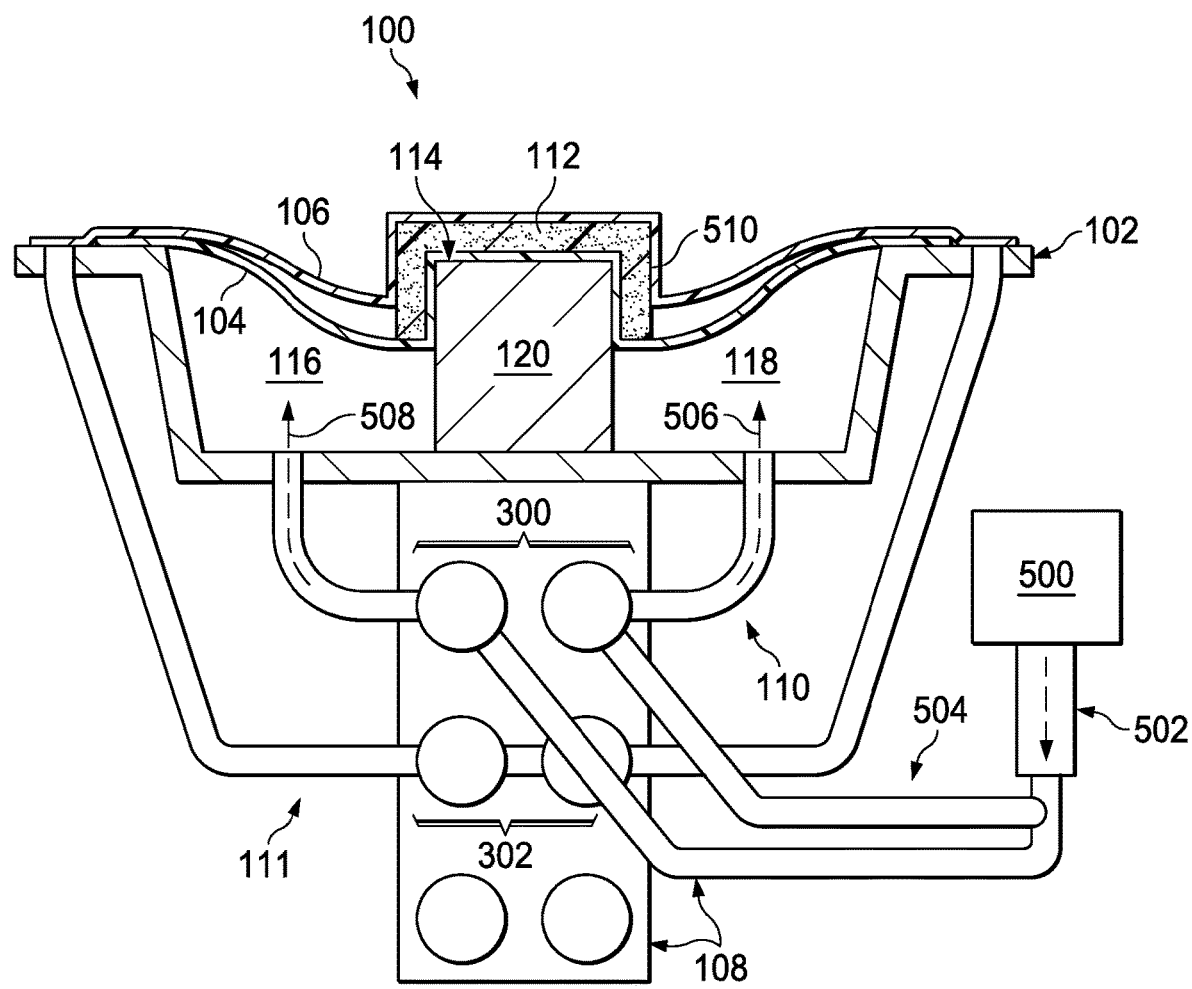
FIG. 5 is an illustration of a cross-sectional view of a composite fabrication system during debagging in accordance with an illustrative embodiment.
Figure 6:
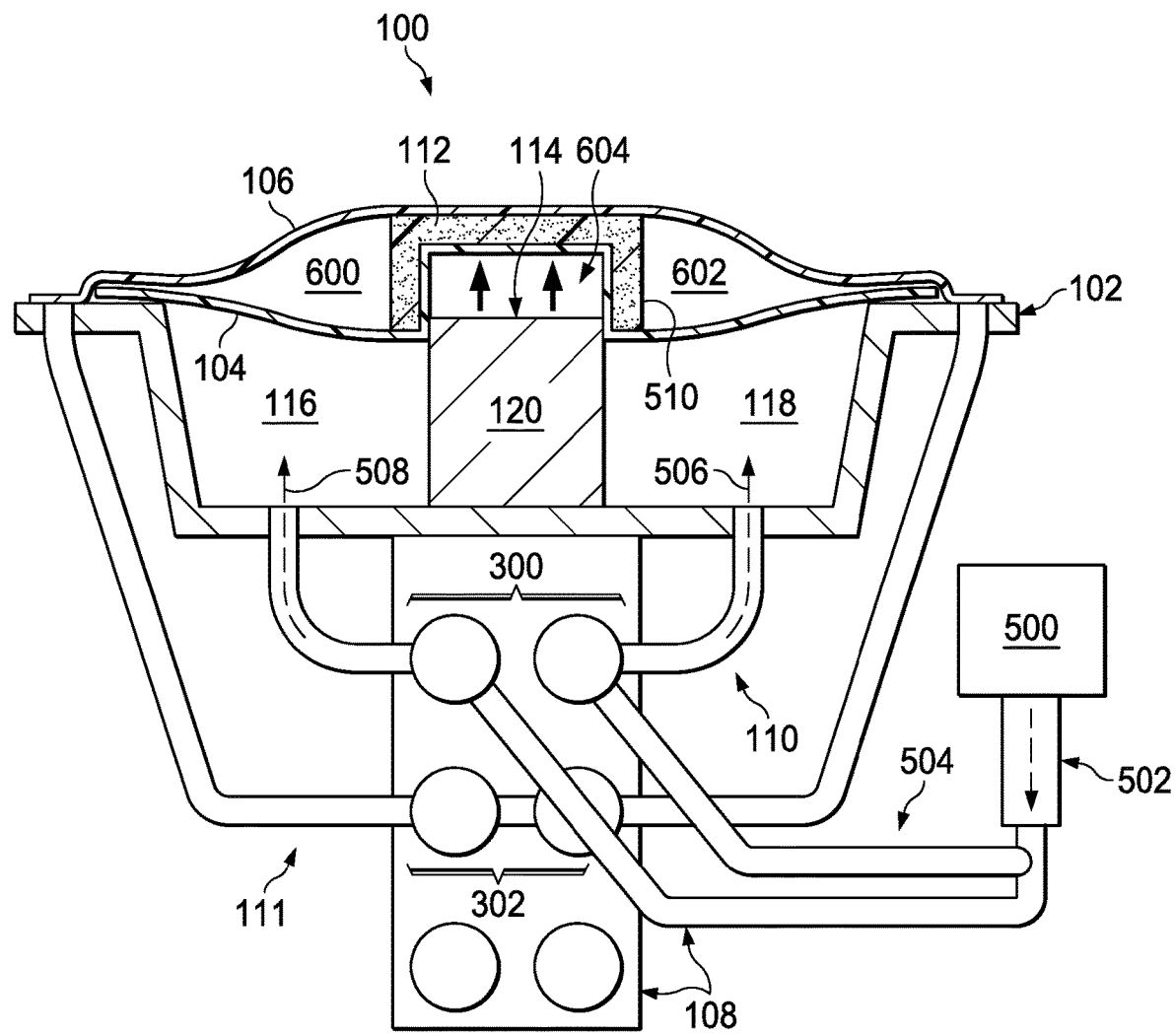
FIG. 6 is another illustration of a cross-sectional view of a composite fabrication system during debagging in accordance with an illustrative embodiment.

FIGS. 5-6 are illustrations of a cross-sectional view of the debagging process depicted in accordance with an illustrative embodiment. As illustrated in FIG. 5, air pressure control system 108 now comprises compressed air source 500 and valve system 502.

During the vacuum pressure stage, as shown in FIGS. 3-4, valve system 502 may be in a closed position such that no compressed air enters the system. During debagging, valve system 502 is switched to an open position such that compressed air source 500 supplies compressed air via supply lines 504 and supply lines 110 to the assembly.

In this illustrative example, compressed air flows in the direction of arrow 506 into cavity 118 in tool 102. At substantially the same time, compressed air flows in the direction of arrow 508 into cavity 116 in tool 102. The compressed air inflates vacuum bag 104. Neither vacuum source 300 nor vacuum source 302 apply vacuum pressure during this time. Cured composite structure 510 remains on mandrel 120.

FIG. 6 shows the assembly as more compressed air has entered cavity 116 and cavity 118. As depicted, the compressed air has seeped through vacuum bag 104 into vacuum bag 106. The compressed air fills gap 600 and gap 602 between vacuum bag 104 and vacuum bag 106. Space 604 is created between surface 114 of mandrel 120 and cured composite structure 510. The compressed air in space 604 underneath vacuum bag 104 lifts cured composite structure 510 from mandrel 120 such that cured composite structure 510 can be removed with ease. In this illustrative example, the compressed air lifts the web of cured composite structure 510 along the entire length of cured composite structure 510.

Figure 7:
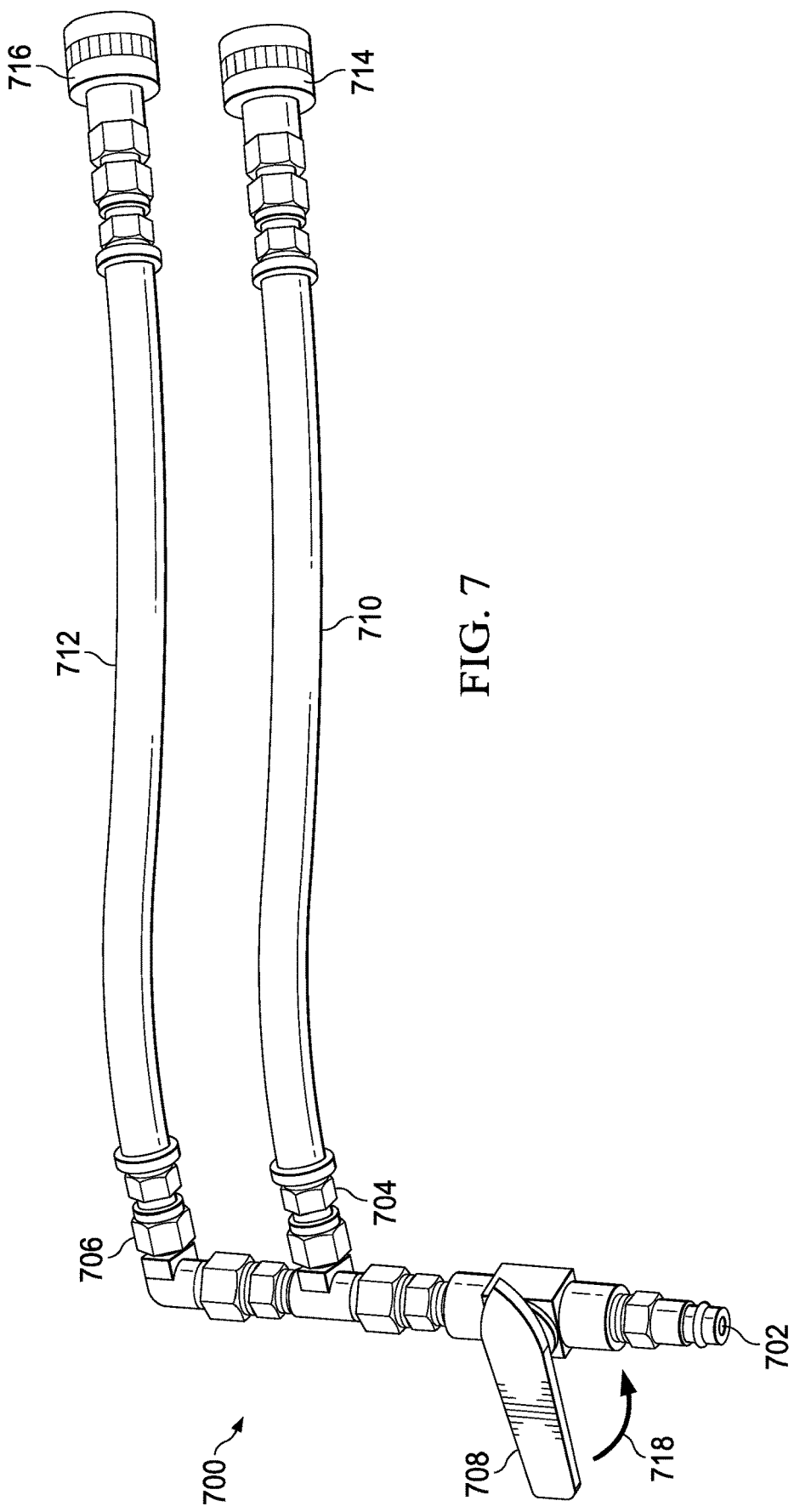
FIG. 7 is an illustration of a valve system and supply lines in accordance with an illustrative embodiment.

Turning now to FIG. 7, an illustration of a valve system is depicted in accordance with an illustrative embodiment. Valve system 700 is an example of a physical implementation for valve system 234 shown in block form in FIG. 2.

In this illustrative example, valve system 700 comprises port 702, port 704, port 706, and switch 708. Port 702 is configured to be in fluid communication with a compressed air source. Port 704 is in fluid communication with supply line 710 while port 706 is in fluid communication with supply line 712. Supply line 710 has connector 714 and supply line 712 has connector 716, both of which are configured to be connected to other components in air pressure control system 108.

As depicted, switch 708 is in the closed position. Switch 708 may be manually moved in the direction of arrow 718 to an open position when compressed air is desired in the system. In another illustrative example, valve system 700 may be operated by a computer system, robotic operator, or in some other suitable manner.

Valve system 700 is an example of only one configuration for valve system 234 shown in block form in FIG. 2. Other implementations of an illustrative embodiment may include more than one switch, more than two supply lines, additional valves downstream, or other suitable configurations.

The different components shown in FIG. 1 and FIGS. 3-7 may be combined with components in FIG. 2, used with components in FIG. 2, or a combination of the two. Additionally, some of the components in FIG. 1 and FIGS. 3-7 may be illustrative examples of how components shown in block form in FIG. 2 may be implemented as physical structures.

Other configurations for composite fabrication system 100 may be implemented other than those shown in FIGS. 3-7. For example, a plurality of additional openings may exist in tool 102 such that compressed air may inflate vacuum bag 104 in a desired manner along the entire length of cured composite structure 510. In other illustrative examples, the bag, the cavity, the tool, or other components in composite fabrication system 100 may be segmented.

The composite fabrication process described with reference to FIGS. 3-6 does not include all steps needed to manufacture a composite structure for aircraft applications. For instance, if a composite preform is used for composite material 112, the composite preform is positioned on top of vacuum bag 104 on mandrel 120. The composite preform is then infused with resin prior to curing. In still other illustrative examples, manufacturing processes may be needed before, after, or in between the steps shown in FIGS. 3-6. The illustrations herein are not meant to be inclusive of all steps.

Figure 8:
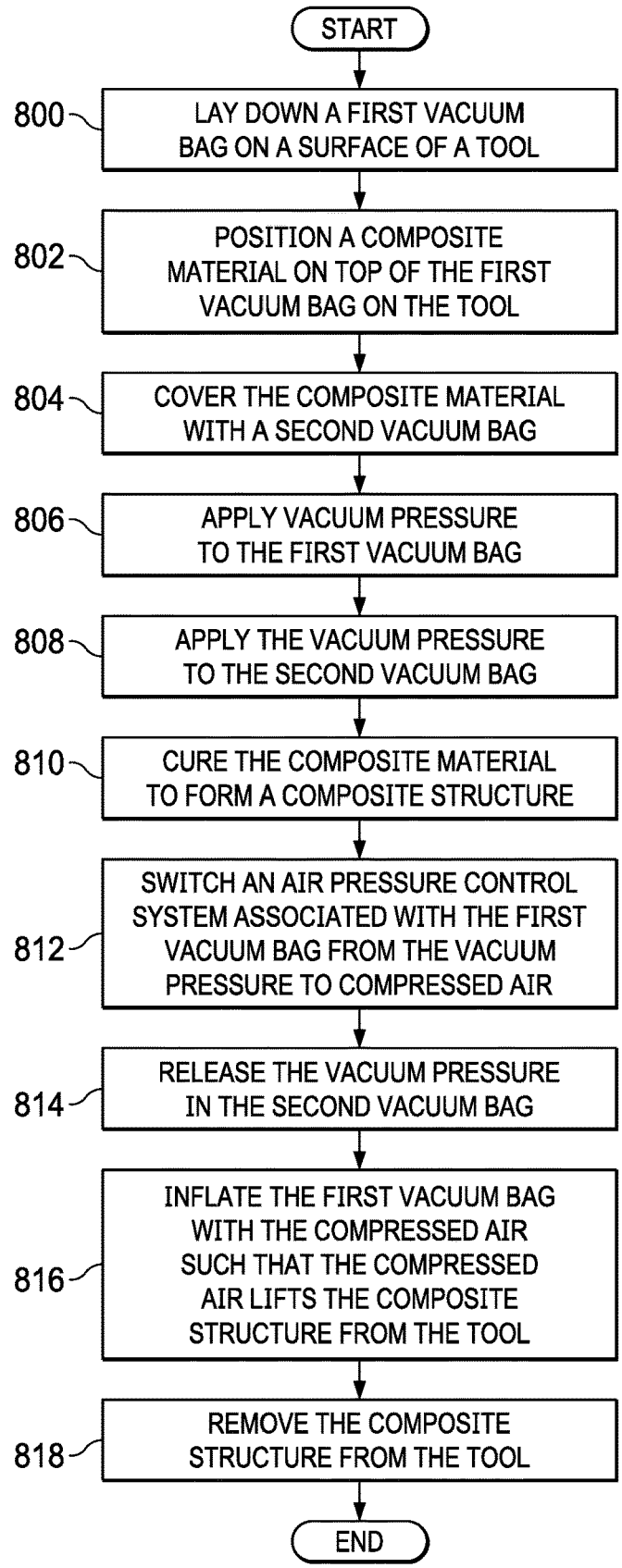
FIG. 8 is an illustration of a flowchart of a process for forming a composite structure for an aircraft in accordance with an illustrative embodiment.

With reference next to FIG. 8, an illustration of a flowchart of a process for forming a composite structure for an aircraft is depicted in accordance with an illustrative embodiment. The method depicted in FIG. 8 may be used to form composite structure 204 for aircraft 207 shown in FIG. 2.

The process begins by laying down a first vacuum bag on a surface of a tool (operation 800). Next, a composite material is positioned on top of the first vacuum bag on the tool (operation 802). The composite material is covered with a second vacuum bag (operation 804).

The process then applies vacuum pressure to the first vacuum bag (operation 806). The vacuum pressure is also applied to the second vacuum bag (operation 808). Next, the composite material is cured to form a composite structure (operation 810).

Thereafter, the process switches an air pressure control system associated with the first vacuum bag from the vacuum pressure to compressed air (operation 812). Inflating the first vacuum bag with the compressed air at a desired rate and pressure lifts a web of the composite structure along a length of the composite structure.

As the first vacuum bag inflates, the vacuum pressure is released in the second vacuum bag (operation 814). The first vacuum bag is inflated with the compressed air such that the compressed air lifts the composite structure from the tool (operation 816). Next, the composite structure is removed from the tool (operation 818) with the process terminating thereafter.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

Figure 9:
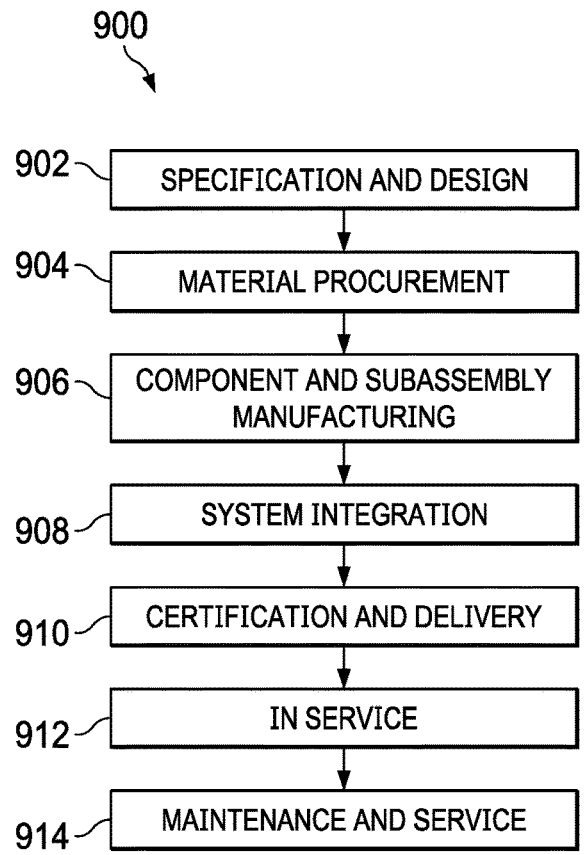
FIG. 9 is an illustration of a block diagram of an aircraft manufacturing and service method in accordance with an illustrative embodiment.
Figure 10:
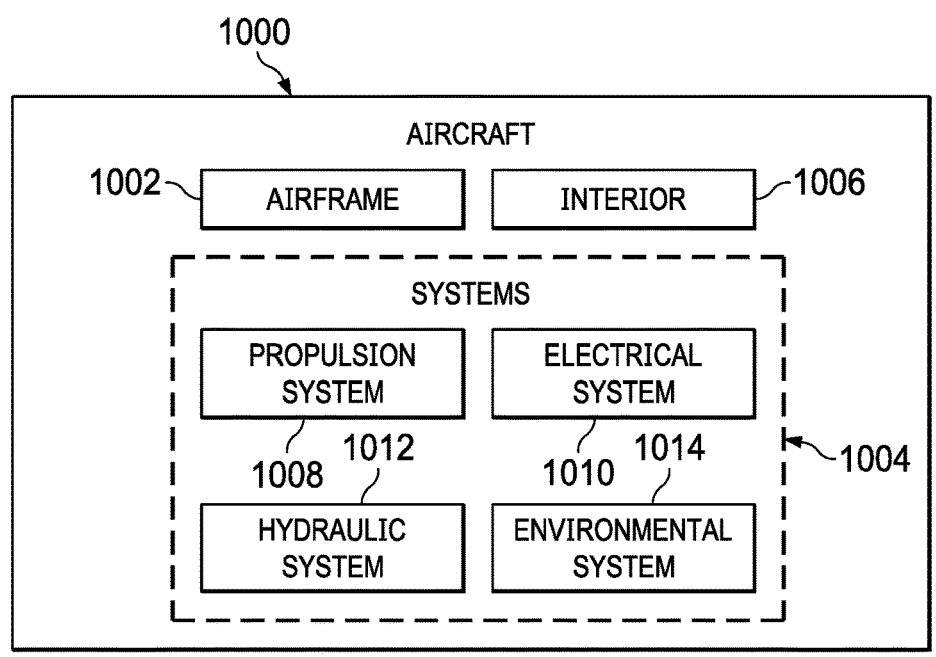
FIG. 10 is an illustration of a block diagram of an aircraft in which an illustrative embodiment may be implemented.

Illustrative embodiments of the disclosure may be described in the context of aircraft manufacturing and service method 900 as shown in FIG. 9 and aircraft 1000 as shown in FIG. 10. Turning first to FIG. 9, an illustration of a block diagram of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Composite structure 204 from FIG. 2 formed using composite fabrication system 202 may be made during component and subassembly manufacturing 906. In addition, composite fabrication system 202 may be used to modify parts made for routine maintenance and service 914 as part of a modification, reconfiguration, or refurbishment of aircraft 1000 in FIG. 10. Compressed air 229 may be used to separate composite parts from a tool in either component and subassembly manufacturing 906 or routine maintenance and service 914.

Each of the processes of aircraft manufacturing and service method 900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of a block diagram of an aircraft is depicted in which a composite structure made using an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while aircraft 1000 is in service 912, during maintenance and service 914 in FIG. 9, or both. The use of a number of the different illustrative embodiments may substantially expedite the assembly of aircraft 1000, reduce the cost of aircraft 1000, or both expedite the assembly of aircraft 1000 and reduce the cost of aircraft 1000.

With the use of an air pressure control system in accordance with an illustrative embodiment, fabricators can more easily remove cured composite parts from a tool. Because the part is being lifted from its web, and not being pulled in multiple directions by various operators, damage to the part may be reduced or eliminated. Damage to the bags or other structures in the assembly is also mitigated.

In addition, the use of an illustrative embodiment reduces the risk of injury or repetitive strain to human operators. Parts are separated from the tool more quickly than with currently used systems such that fabrication processes are more efficient, saving both time and money.

The design of the system as described herein eliminates the need to significantly modify existing tooling. Instead, a manifold is attached to the system and shop air is used to inflate the vacuum bag between the tool and the part. The top vacuum bag prevents parts from popping off the tool in an undesired manner. However, the system is controlled such that the top vacuum bag can be removed prior to lifting the part.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for fabricating a composite structure, the method comprising:
   laying down a first vacuum bag on a surface of a tool;
   positioning a composite material on top of the first vacuum bag on the tool;
   covering the composite material with a second vacuum bag;
   applying a first vacuum pressure to the first vacuum bag through a first supply line;
   applying a second vacuum pressure to the second vacuum bag through a second supply line to form the composite material to a shape of the tool before curing the composite material;
   curing the composite material to form the composite structure; and
   inflating the first vacuum bag with compressed air through the first supply line and releasing the second vacuum pressure through the second supply line to form a gap between the first vacuum bag and the second vacuum bag and to create a space between the first vacuum bag and the tool, wherein the compressed air in the space lifts the composite structure from the tool.

2. The method of claim 1, wherein the composite material comprises a composite preform and a resin, and further comprising:
   positioning a composite preform on top of the first vacuum bag on the tool; and
   infusing the composite preform with the resin prior to curing.

3. The method of claim 2 further comprising:
   switching an air pressure control system associated with the first vacuum bag from the first vacuum pressure to the compressed air.

4. The method of claim 1 further comprising:
   removing the composite structure from the tool.

5. The method of claim 1, wherein inflating the first vacuum bag with the compressed air lifts a web of the composite structure along a length of the composite structure.

6. The method of claim 5, wherein inflating the first vacuum bag with the compressed air comprises:
   inflating the first vacuum bag at a desired rate along the length of the composite structure.

7. The method of claim 6 further comprising:
   determining a desired pressure for the compressed air corresponding to the desired rate for inflating the first vacuum bag.

8. The method of claim 1 further comprising:
   filling a cavity between the tool and the first vacuum bag with the compressed air before the compressed air in the space lifts the composite structure from the tool.

9. A method for fabricating a composite structure for an aircraft, the method comprising:
   laying down a first vacuum bag on a surface of a tool;
   positioning a composite preform on top of the first vacuum bag on the tool;
   covering the composite preform with a second vacuum bag;
   infusing the composite preform with resin;
   applying a first vacuum pressure to the first vacuum bag through a first supply line and a second vacuum pressure to the second vacuum bag through a second supply line to form the composite preform to a shape of the tool before curing the composite preform;
   curing the composite preform and the resin to form the composite structure; and
   inflating the first vacuum bag with compressed air through the first supply line and releasing the second vacuum pressure through the second supply line forming a gap between the first vacuum bag and the second vacuum bag and creating a space between the first vacuum bag and the tool, wherein the compressed air in the space lifts the composite structure from the tool.

10. The method of claim 9 further comprising:
    switching an air pressure control system from the first vacuum pressure to the compressed air.

11. The method of claim 9 further comprising:
    removing the composite structure from the tool.

12. The method of claim 9, wherein inflating the first vacuum bag with the compressed air lifts a web of the composite structure along a length of the composite structure.

13. The method of claim 12, wherein inflating the first vacuum bag with the compressed air comprises:
    inflating the first vacuum bag at a desired rate along the length of the composite structure.

14. The method of claim 13 further comprising:
    determining a desired pressure for the compressed air corresponding to the desired rate of inflating the first vacuum bag.

15. The method of claim 9 further comprising:
    releasing the second vacuum pressure in the second vacuum bag as the first vacuum bag inflates.

16. The method of claim 9, wherein the composite preform is infused with the resin prior to curing.

17. The method of claim 9, further comprising:
    filling a cavity between the tool and the first vacuum bag with the compressed air before the compressed air in the space lifts the composite structure from the tool.

18. The method of claim 9, further comprising:
    switching an air pressure control system associated with the first vacuum bag from the first vacuum pressure to the compressed air.

19. The method of claim 1 further comprising:
    releasing the second vacuum pressure in the second vacuum bag as the first vacuum bag inflates.

20. The method of claim 1, further comprising:
    switching an air pressure control system associated with the first vacuum bag from the first vacuum pressure to the compressed air.

* * * * *